United States Patent Office 3,145,852
Patented Aug. 25, 1964

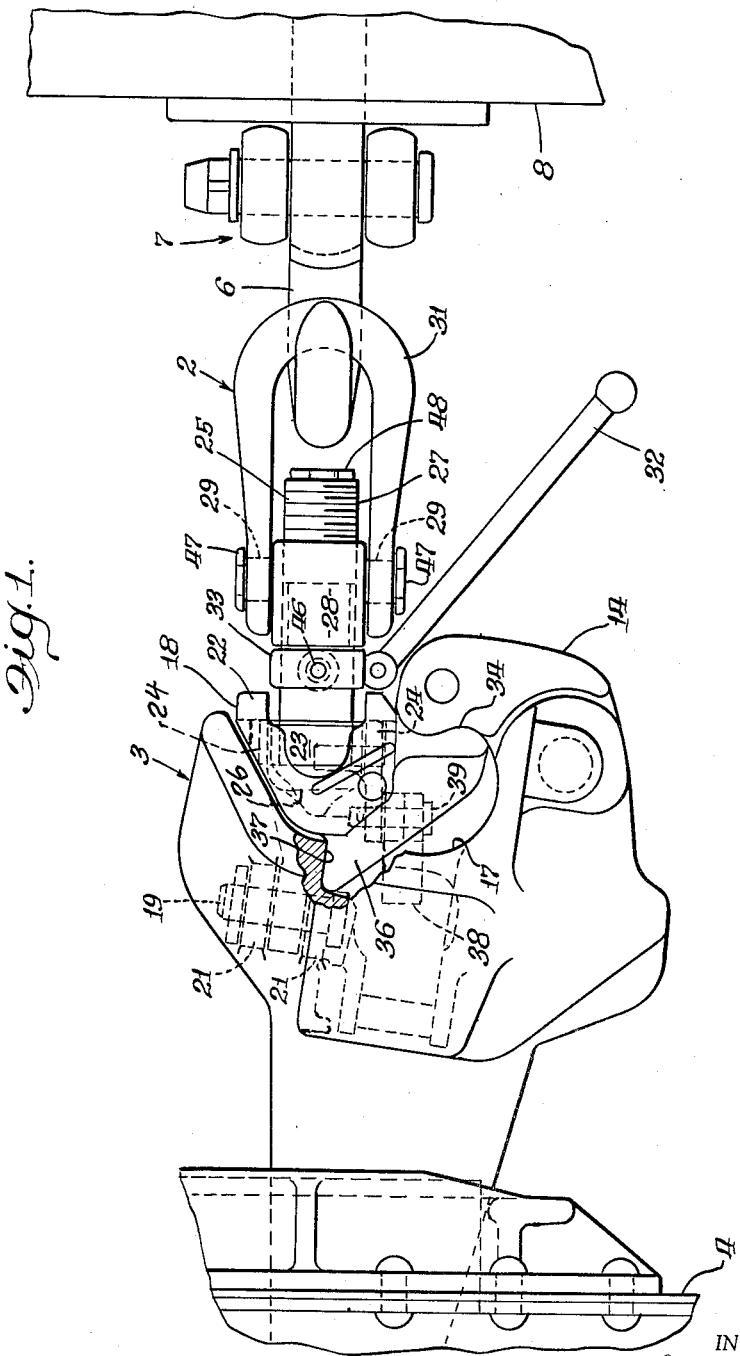

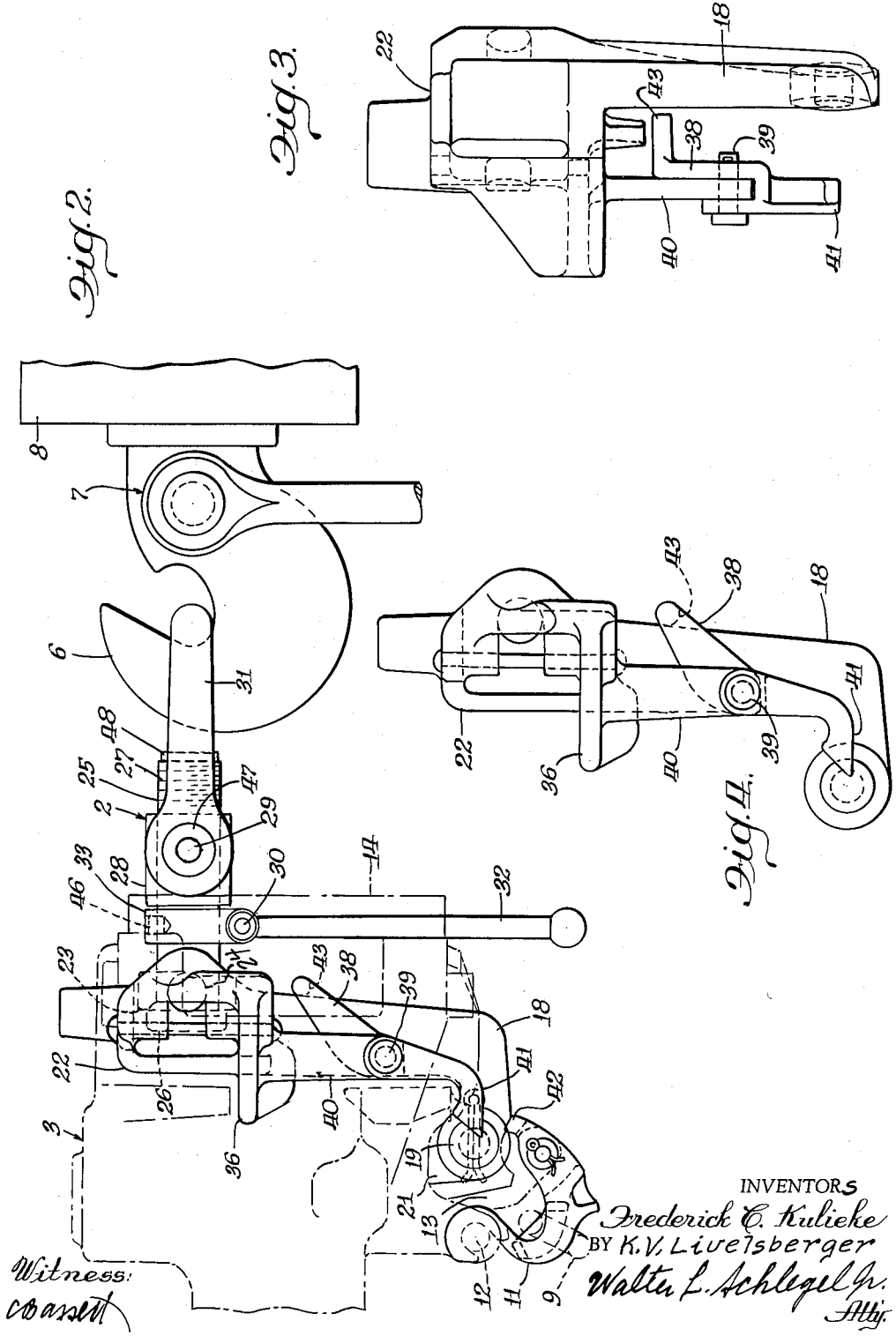

3,145,852
TRANSITION COUPLING MEANS
Frederick C. Kulieke and Kenneth V. Livelsberger, Alliance, Ohio, assignors to Amsted Industries Incorporated, Chicago, Ill., a corporation of New Jersey
Filed Apr. 26, 1963, Ser. No. 275,910
8 Claims. (Cl. 213—112)

This invention relates to coupling devices for railway cars and more particularly to a transition coupling for connecting an automatic knuckle type coupler to a draw hook of a screw coupling.

In some countries, railway cars are provided with manually operated screw and draw hook coupling devices which are being gradually replaced by automatic knuckle type couplers. During this transition period, it is necessary to provide a transition coupling for connecting an automatic coupler to a draw hook of a screw coupling.

It is, therefore, an object of the invention to provide a transition coupling adapted to connect an automatic knuckle type coupler to a draw hook of a screw type coupler.

Another object of the invention resides in the provision of a transition coupling adapted to be mounted on or removed from a conventional automatic knuckle type coupler.

A further object of the invention resides in the provision of a transition coupling adapted to be engaged in operative position by the knuckle of an automatic coupler, and embodying latch means to prevent accidental unlocking of the coupler knuckle.

The invention embodies other novel features, details of construction and arrangement of parts which are hereinafter set forth in the specification and claims and illustrated in the accompanying drawings, forming part thereof, wherein:

FIGURE 1 is a top plan view showing an automatic knuckle type coupler and a draw hook connected by a transition coupling embodying features of the invention.

FIGURE 2 is a side elevation of the structure of FIGURE 1.

FIGURES 3 and 4 are fragmentary detail views illustrating the transition coupling arm and latch pivotally mounted thereon.

Referring now to the drawings for a better understanding of the invention, a transition coupling 2 embodying features of the invention is shown as mounted upon an automatic coupler 3 on a railway car 4 for detachable connection with a hook 6 of a draw hook and screw coupling device 7 provided on a railway car 8.

The automatic coupler 3 illustrated in the drawings is of a conventional bottom rotary operating type, now in common use on United States railroads, in which an operating rod 9 is manually operated to rotate the rotor lever 11 upwardly about a trunnion 12 to raise the lock lifter 13. The lifter 13 then acts to move a lock upwardly to permit the knuckle 14 to pivot to its open position. The coupler 3 is formed with a throat 17 adapted to receive a knuckle of a mating coupler.

The transition coupling 2 is shown as comprising an arm 18 having one end thereof pivotally mounted on a pin 19 extending through aligned openings formed in a pair of spaced ears 21 provided on the lower surface of the coupler 3. The other end of the arm 18 is formed with a head 22 adapted to be secured in fixed position within the throat 17 of the coupler by the knuckle 14. A collar 23 is formed with trunnions 24 journaled in openings formed in the head 22, and an adjusting screw 25 is journaled in the collar and formed with an enlarged cylindrical end portion 26 engaged between the collar and the head 22.

The screw 25 is formed with threads 27 to engage a trunnion nut 28 formed with trunnions 29 engaged in apertures formed in a clevis 31 adapted to receive the hook 6 of the device 7. A handle 32 is pivotally connected at 30 to a collar 33 secured to the screw 25 between the head 22 and the nut 28. As illustrated in FIGURE 1, the head 22 is formed with an abutment surface 34 for engagement against the inner surface of the knuckle. To prevent twisting of the head under draft forces, the head is formed with a lug 36 for engagement against a shoulder 37 on the coupler 3.

To prevent manual unlocking of the automatic coupler when the transition coupling is employed to connect two cars, a latch 38 is pivotally mounted intermediate its ends on a pivot pin 39 provided on an ear 40 on the head 22, the lower end 41 of the latch being disposed by gravity for abutting engagement by the bridge 42 on the rotor lever 11. The upper end of the latch is formed with an offset end 43 for engagement by the trunnion nut 28 when the clevis 31 is removed from the hook 6 for movement of the transition coupling to its lower position.

The screw 25 and collar 33 are formed with aligned openings to receive a plug 46 which is welded at its outer end to the collar. Washers 47 are welded to the outer ends of the trunnions 29, and a washer 48 is welded to the outer end of the screw 25.

In operation, the transition coupling 2 is adapted to be pivoted upwardly from its inoperative position to its operative position in which the head 22 of the arm 18 is engaged within the throat 17 of the automatic coupler 3 by movement of the knuckle 14 to its locked position. The clevis 31 is then engaged to the hook 6, and the screw 25 is manually rotated until conventional buffers on the cars are moved into abutting engagement.

After the cars 4 and 8 have thus been secured together by the transition coupling, it will be noted that the lower end 41 of the latch 38 will be positioned by gravity above the bridge 42 of the rotor lever 11 to limit manual upward pivotal movement of the latter and thus prevent accidental unlocking of the knuckle.

The transition coupling 2 is moved from its operative position to its inoperative position by first manually rotating the screw 25 to release the clevis 31 from the hook 6. The screw 25 is then pivoted downwardly to cause the trunnion nut 28 to engage the offset portion 43 of the latch 38 and pivot the latter in a counterclockwise direction, as viewed in FIGURE 2, to move the lower end 41 of the latch out of the line of pivotal travel of the bridge 42 of the rotor lever 11. The rotor lever 11 is then manually actuated by the operating rod 9 to unlock and move the knuckle to its open position to permit the arm 18 to be pivoted downwardly to its inoperative position.

We claim:

1. In a transition coupling means, the combination with an automatic coupler having a pivotal knuckle and a bottom rotary operating mechanism, an arm pivotally connected at one end thereof to the underside of the coupler, a head provided on the other end of said arm for engagement behind said knuckle, means pivotally connected to said head for detachable engagement with a hook type coupler, and a latch provided on said arm to prevent accidental operation of the rotary operating mechanism.

2. In a transition coupling means, the combination with an automatic coupler having a pivotal knuckle and a bottom rotary operating mechanism, an arm pivotally connected at one end thereof to the underside of the coupler, a head provided on the other end of said arm for engagement behind said knuckle, means pivotally connected to said head for detachable engagement with a hook type coupler, and a latch provided on said arm to prevent accidental operation of the rotary operating mechanism, said rotary operating mechanism comprising a pivotal rotor lever engaged by said latch.

3. In a transition coupling means, the combination with an automatic coupler having a pivotal knuckle and a bottom rotary operating mechanism, an arm pivotally connected at one end thereof to the underside of the coupler, a head provided on the other end of said arm for engagement behind said knuckle, means pivotally connected to said head for detachable engagement with a hook type coupler, and a latch provided on said arm to prevent accidental operation of the rotary operating mechanism, said rotary operating mechanism comprising a pivotal rotor lever engaged by said latch, said means being pivotable downwardly to engage and retract said latch to an inoperative position.

4. In a transition coupling means, the combination with an automatic coupler having a pivotal knuckle and a bottom rotary operating mechanism, an arm pivotally connected at one end thereof to the underside of the coupler, a head provided on the other end of said arm for engagement behind said knuckle, means pivotally connected to said head for detachable engagement with a hook type coupler, and a latch provided on said arm to prevent accidental operation of the rotary operating mechanism, said latch being pivotally mounted on said arm.

5. In a transition coupling means, the combination with an automatic coupler having a pivotal knuckle and a bottom rotary operating mechanism, an arm pivotally connected at one end thereof to the underside of the coupler, a head provided on the other end of said arm for engagement behind said knuckle, means pivotally connected to said head for detachable engagement with a hook type coupler, and a latch provided on said arm to prevent accidental operation of the rotary operating mechanism, said latch being pivotally mounted intermediate its ends on said arm.

6. In a transition coupling means, the combination with an automatic coupler having a pivotal knuckle and a bottom rotary operating mechanism, an arm pivotally connected at one end thereof to the underside of the coupler, a head provided on the other end of said arm for engagement behind said knuckle, means pivotally connected to said head for detachable engagement with a hook type coupler, and a latch provided on said arm to prevent accidental operation of the rotary operating mechanism, said latch being pivotally mounted intermediate its ends on said arm, said operating mechanism comprising a pivotal rotor lever engaged against pivotal movement by said latch.

7. In a transition coupling means, the combination with an automatic coupler having a pivotal knuckle and a bottom rotary operating mechanism, an arm pivotally connected at one end thereof to the underside of the coupler, a head provided on the other end of said arm for engagement behind said knuckle, means pivotally connected to said head for detachable engagement with a hook type coupler, and a latch provided on said arm to prevent accidental operation of the rotary operating mechanism, said latch being pivotally mounted intermediate its ends on said arm, said operating mechanism comprising a pivotal rotor lever engaged against pivotal movement by said latch, said means being pivotable downwardly to engage and pivot said latch to an inoperative position, whereby said operating mechanism may be manually actuated to unlock the knuckle.

8. In a transition coupling means, the combination with an automatic coupler having a pivotal knuckle and a bottom rotary operating mechanism, an arm pivotally connected at one end thereof to the underside of the coupler, a head provided on the other end of said arm for engagement behind said knuckle, means pivotally connected to said head for detachable engagement with a hook type coupler, and a latch provided on said arm to prevent accidental operation of the rotary operating mechanism, said means comprising a collar pivotally connected to said head, a screw journaled in said collar, a trunnion nut in threaded engagement on the screw, a clevis pivotally connected to said nut for engagement with a hook type coupler, and manually operable means to rotate the screw.

References Cited in the file of this patent
UNITED STATES PATENTS

| | | |
|---|---|---|
| 1,535,974 | Whitridge | Apr. 25, 1925 |
| 1,599,038 | Bush | Sept. 7, 1926 |